UNITED STATES PATENT OFFICE 2,682,541

PREPARATION OF ALIPHATIC CYANURATES

Donald W. Kaiser, Old Greenwich, Conn., assignor to American Cyanamid Company, New York, N. Y., a corporation of Maine No Drawing. Application September 21, 1951, Serial No. 247,770

8 Claims. (Cl. 260—248)

The present invention relates to the preparation of aliphatic cyanurates.

An object of the present invention is to provide a method for the preparation of aliphatic cyanurates.

Another object of the present invention is to provide a method whereby aliphatic iminocarbonates may be converted to the corresponding aliphatic cyanurates rapidly and in good yield using simple and inexpensive materials and apparatus.

Other objects of the invention will be apparent from the discussion that follows.

The process of the present invention comprises treating an aliphatic iminocarbonate with a salt of a weak inorganic base and a strong inorganic acid to provide the corresponding aliphatic cyanurate. Apparently the reaction occurs as shown in Equation 1.

(1)
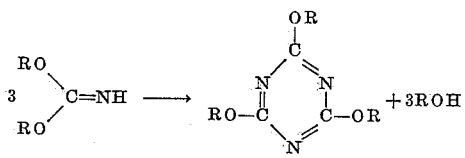

where R is an aliphatic radical.

While the reaction may be carried out over a wide range of temperatures, particular advantage from the standpoint of time obtains with the use of a temperature within the range of substantially 150°–300° C. At temperatures of the order of room temperature, for example, substantial conversion of an aliphatic iminocarbonate to the corresponding cyanurate requires weeks in some cases, whereas at the recommended elevated temperatures conversion is effected in a matter of minutes. While temperatures in excess of 300° C. may be employed, the use of such provides no additional advantage and, in fact, may result in some decomposition of the product.

Generally, conversion is carried out under conditions that provide for the simultaneous removal of the by-product alcohol since this provides an indication of the course of the reaction and by virtue of mass action considerations permits the highest possible yields to be obtained. In addition, the higher boiling cyanurates are usually purified by distillation so that in any event the removal of the lower boiling alcohols would be necessary. While the low boiling alcohols such as methyl, ethyl, isopropyl, and the like are readily removed by distillation when operating the process of the present invention within the above-recommended temperature range, it is usually desirable to facilitate the removal of the higher boiling alcohols such as decyl, lauryl, octadecyl and the like by employing reduced pressure.

The catalytic salts contemplated in the process of the present invention are those resulting from the complete neutralization of a strong inorganic acid with a weak inorganic base. Such neutralization while resulting in the complete replacement of all of the hydrogen ions of the acid provides a salt giving rise to an acidic solution when dissolved in water. Incompletely neutralized salts containing hydrogen, such as, for example, a bisulphate are not contemplated despite the fact that their aqueous solutions are acidic. Examples of such catalytic salts are ammonium chloride, ammonium bromide, ammonium nitrate, ammonium sulfate, ferric chloride, ferric bromide, ferric nitrate, ferric sulfate, aluminum chloride, aluminum bromide, aluminum nitrate, aluminum sulfate, stannous chloride, stannous bromide, stannous nitrate, stannous sulfate, cobaltous chloride, cobaltic bromide, cobaltous nitrate, cobaltic sulfate, cuprous chloride, cuprous bromide, cuprous nitrate, cuprous sulfate, cupric chloride, cupric bromide, cupric nitrate, cupric sulfate, calcium chloride, calcium bromide, calcium nitrate, calcium sulfate, magnesium chloride, magnesium bromide, magnesium nitrate, magnesium sulfate, chromic chloride, chromic bromide, chromic nitrate, chromic sulfate, lead nitrate, nickel chloride, nickel nitrate, nickel sulfate and the like. Such salts are employed in catalytic amount, about 1% by weight of the amount of aliphatic iminocarbonate treated being highly adequate, although lesser and greater amounts may be employed if desired.

EXAMPLE 1 n-Propyl cyanurate

A mixture of 110 g. of n-propyl iminocarbonate and 1 g. of $SnCl_2.2H_2O$ was placed in a distillation flask and heated to 180° C. After about 52 ml. of n-propanol had distilled over, cyanurate conversion appeared to be ended so that the residue was distilled under reduced pressure. Such distillation yielded 41 g. (63.5% of theory) of n-propyl cyanurate as a colorless viscous oil boiling at 120° C./0.65 mm.

EXAMPLE 2

Allyl cyanurate

A mixture of 26 g. of allyl iminocarbonate and 0.5 g. of $FeCl_3.6H_2O$ was heated to 150° C., in a distillation flask and resulted in the recovery of 10 ml. of allyl alcohol. Thereafter distillation of the residue under reduced pressure provided 16 g. (100% of theory) of allyl cyanurate boiling at 72° C./0.35 mm.

EXAMPLE 3

β-Methoxyethyl cyanurate

A mixture of 100 g. of β-methoxyethyl iminocarbonate was heated with 1 g. of CuBr in a distillation flask resulting in distillation of 41 ml. of ethylene glycol monomethyl ether over a temperature range of 150°–210° C. Thereafter distillation under reduced pressure provided 41 g. (75.4% of theory) of β-methoxyethyl cyanurate at 170° C./0.45 mm.

EXAMPLE 4 n-Decyl cyanurate

A mixture of 100 g. of decyl iminocarbonate and 1 g. of $ZnCl_2$ was heated in a distillation flask to about 180° C. under slightly reduced pressure. 52 g. of n-decanol were distilled from the reaction mixture to provide a residue of n-decyl cyanurate from which the $ZnCl_2$ was removed by filtration.

EXAMPLE 5 n-Butyl cyanurate (A) A mixture of 173 g. of n-butyl iminocarbonate and 1.0 g. of $CaCl_2$ was heated at a temperature of 205–210° C. in a distillation flask. After the distillation of n-butanol had apparently ceased the residue was distilled under reduced pressure to provide 46 g. (46.5% of theory) of n-butyl cyanurate boiling at 170°–173° C./4 mm.

(B) A mixture of 173 g. of n-butyl iminocarbonate and 1.0 g. of $ZnCl_2$ was heated in a distillation flask at 205°–210° C. After the distillation of n-butanol had apparently ceased, the residue was distilled under reduced pressure to provide 65 g. (65.5% of theory) of n-butyl cyanurate boiling at 180°–184° C./4–5 mm.

(C) 157.5 g. of n-butyl iminocarbonate were treated at 180°–195° C. with 10 g. of $AlCl_3$ in a distillation apparatus. After the distillation of the n-butanol had apparently ceased the residue was distilled under reduced pressure to provide 5 g. of n-butyl iminocarbonate at 60°–75° C./0.6 mm. and 48.7 g. (54% of theory) of n-butyl cyanurate at 165°–170° C./0.6 mm.

Other aliphatic iminocarbonates which may be treated in accordance with the process of the present invention to provide the corresponding cyanurates are the methyl, ethyl, isopropyl, n-amyl, iso-amyl, β-methoxyethyl, β-ethoxyethyl, β-propoxyethyl, cyclopentyl, cyclohexyl, n-hexyl, n-octyl, iso-octyl, nonyl, undecyl, dodecyl, pentadecyl, octadecyl, β-chloroethyl, β-(β'-methoxy)-ethoxyethyl, 2-ethylbutyl, 2-ethylhexyl, and the like.

The aliphatic cyanurates of the present invention are valuable chemicals being useful as intermediates in the preparation of chemotheropeutic agents, pharmaceuticals, textile agents, insecticides, rubber chemicals, plastics, resins and the like.

The aliphatic iminocarbonates can be prepared by the general method of Nef, Annalen, 287, pp. 310–325; or of Hantzsch and Mai, Berichte, 28, p. 247; or, preferably, by the process of Canadian Patent 467,349.

This is a continuation-in-part of applicant's copending S. N. 699,343, filed September 25, 1946, now abandoned.

While the invention has been described with particular reference to specific embodiments, it is to be understood that it is not to be limited thereto but is to be construed broadly and restricted solely by the scope of the appended claims.

I claim:

1. A process for preparing an alkyl cyanurate comprising treating an alkyl iminocarbonate with a catalytic salt resulting from the complete neutralization of a strong inorganic acid with a weak metal base.

2. A process for preparing an alkyl cyanurate comprising treating an alkyl iminocarbonate with a catalytic salt resulting from the complete neutralization of a strong inorganic acid with a weak metal base at an elevated temperature.

3. A process for preparing an alkyl cyanurate comprising treating an alkyl iminocarbonate with a catalytic salt resulting from the complete neutralization of a strong inorganic acid with a weak metal base at a temperature within the range of substantially 150°–300° C.

4. The process of claim 3 employing stannous chloride.

5. The process of claim 3 employing zinc chloride.

6. The process of claim 3 employing ferric chloride.

7. A process for preparing n-propyl cyanurate comprising treating n-propyl iminocarbonate with stannous chloride catalyst at a temperature within the range of substantially 150°–300° C.

8. A process for preparing n-butyl cyanurate comprising treating n-butyl iminocarbonate with zinc chloride catalyst at a temperature within the range of substantially 150°–300° C.

References Cited in the file of this patent

FOREIGN PATENTS

| Number | Country | Date |
|---|---|---|
| 473,960 | Canada | May 29, 1951 |